Patented Jan. 19, 1932

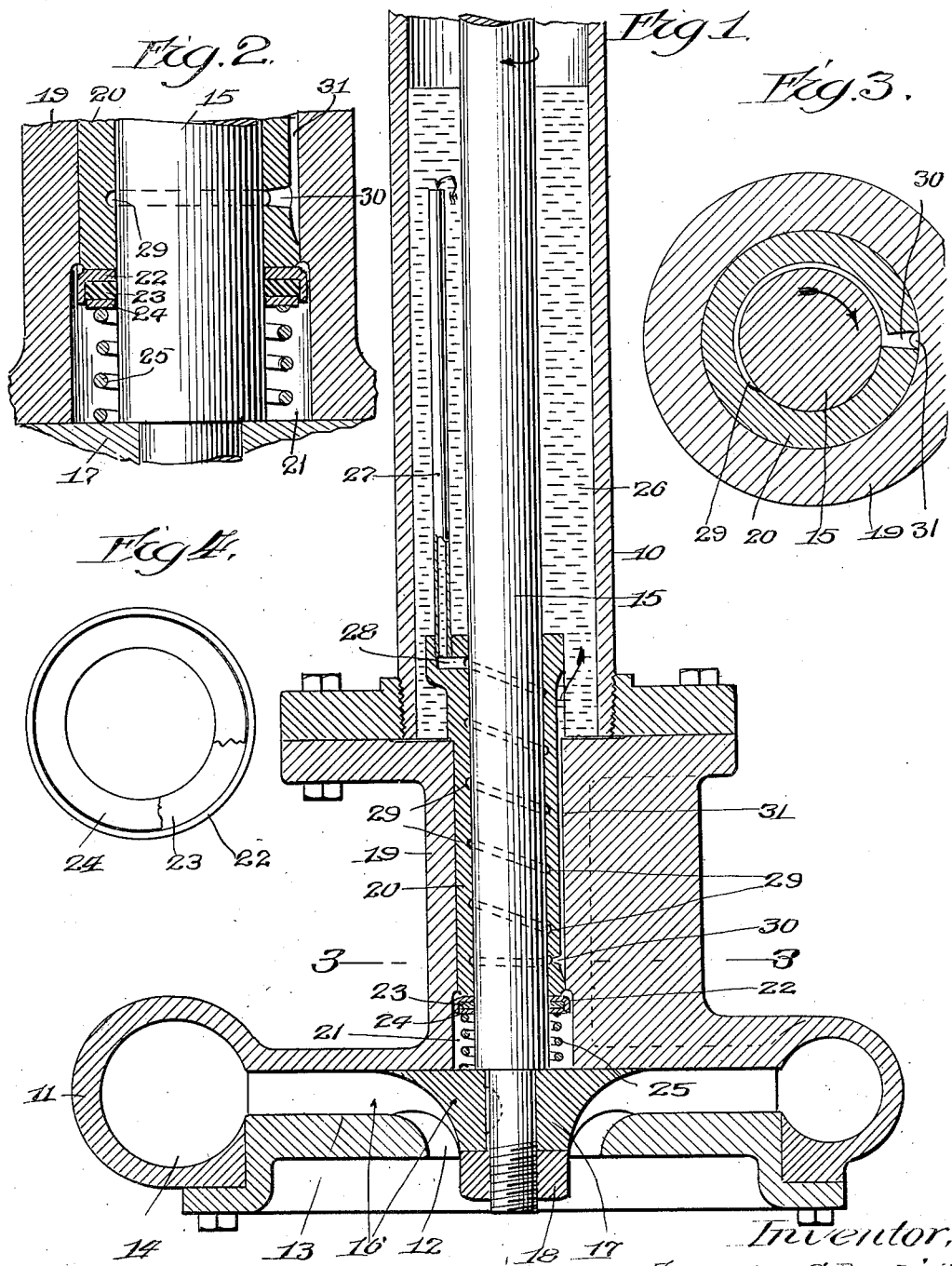

1,842,081

UNITED STATES PATENT OFFICE

AUGUSTUS C. DURDIN, JR., OF CHICAGO, ILLINOIS

SHAFT BEARING FOR PUMPS

Application filed October 13, 1928. Serial No. 312,297.

This invention relates to shaft bearings for pumps and other machinery operating in water or other liquid, and its principal object is to provide means for preventing water or other extraneous liquids from entering the shaft bearing. The invention has particular reference to the bearings of bilge pumps and other submerged pumps used in pumping out basins and other receptacles, although its use is not limited thereto. It is well known that water finds its way into the shaft bearing adjacent the impeller of pumps of this type, and this invention has been devised to eliminate this possibility.

The invention consists in a shaft bearing embodying a seal between the shaft and its bearing for minimizing the leakage of liquid into the shaft bearing and co-operating with an oil supply for lubricating the bearing and serving to counteract the tendency for any water to leak past the seal and enter the bearing. The oil may be supplied to the bearing by force exerted by the rotary impeller shaft, or it may be supplied thereto by gravity, as is desired.

The invention is clearly illustrated in the drawings accompanying this specification in which—

Figure 1 is a central vertical longitudinal section of a pump equipped with a bearing embodying a simple form of the present invention;

Fig. 2 is a fragmental enlarged central vertical section illustrating the seal;

Fig. 3 is a detail horizontal section taken on the line 3—3 of Fig. 1; and

Fig. 4 is a face view of the sealing members partly broken away.

Referring to said drawings, the reference character 10 designates the hanger pipe of a bilge pump suspended from a suitable floor or basin plate (not shown) and having secured to its lower end the pump casing 11 of the device. As usual, the pump casing has an inlet 12, an impeller chamber 13, a fluid passage 14 and a discharge at the end of the fluid passage, as is well understood, which discharge connects with a discharge pipe (not shown) through which the liquid is discharged.

Extending through the hanger pipe is an impeller shaft 15 upon the lower end of which is keyed an impeller 16. Preferably the lower end of the shaft is reduced in diameter and passes through the hub 17 of the impeller and is fastened thereto by a nut 18 threaded upon the reduced end of the shaft. The upper end of the shaft is connected to an electric motor (not shown) as usual.

The pump casing has a neck 19 extending between the body portion of the casing and the hanger pipe, and in said neck is secured the bearing bushing 20 in which the lower end of the shaft is journaled. An annular space 21 is left between the lower end of the bushing and the impeller hub 17, and in said space are sealing members for guarding against the entry of water or other extraneous liquid to the clearing space between the shaft and bushing, which, as shown, comprise, among other things, a flanged ring 22 which has a ground flat face that bears against the ground end face of the bushing. Below the flanged ring is a washer 24, and between the flanged ring and washer is a compressible, resilient seal ring 23, preferably composed of rubber, which is held under compression between the flange of the ring 22 and the shaft.

The flanged ring 22 is loosely mounted upon the shaft 15 (see Fig. 2) whereby it may wabble thereon in order that it may have a true running fit with the lower end of the bushing 20.

Interposed between the sealing member and the hub 17 of the impeller is a coiled compressing spring 25, one end of which bears against the hub and the other end against one of the sealing members. Said spring acts to hold the flanged ring in close contact with the end of the bushing, thereby guarding against leakage between the bushing and flanged ring, and the spring also acts to compress the seal ring 23 and thereby expand it transversely so as to impinge tightly against the internal face of the flanged ring 22 and against the surface of the shaft, whereby leakage past the seal ring is prevented. It will be understood that the sealing members and spring rotate with the shaft, and that the ground faces of the ring 22 and bearing bushing are held in close contact by the spring.

Occasionally a drop of water finds its way past the sealing members, and to prevent said small amount of water from entering the clearance space between the shaft and bushing, oil is supplied to said space under a greater pressure than the water pressure. In the preferred form of the invention, the oil (designated by 26) is positively forced through the clearance space between the shaft and bushing to a point adjacent the lower end of the bushing. As shown, an oil pipe 27 is secured in the top of the bushing 20 and extends up into the hanger pipe and terminates below the level of the body of oil contained therein. Said oil pipe opens into a port 28 formed in the upper end of the bushing and extending to the internal bearing face of the bushing, from which place a groove extends downwards as at 29 around the shaft in a spiral direction to the lower end of the bushing where it leads out through a port 30 and continues upward on the outer face of the bushing in the form of an upright groove 31.

The spiral groove is formed in the internal face of the bearing bushing and is closed by the shaft, whereby a spiral channel is formed between the upper and lower ends of the bushing through which the oil is forced. The upright groove on the external face of the bushing is closed by the internal face of the neck 19 and forms an upright channel terminating and discharging into the interior of the hanger pipe. The spiral channel conveys oil along that part of the shaft contained in the bushing and the rotating shaft serves to force the oil down through the channel 29 to the bottom thereof from which it escapes through the port 30 to the upright groove 31 and discharges into the hanger pipe.

If any water leaks past the seal member and enters the clearance space between the shaft and bushing, it is immediately forced out by the oil at the bottom of the spiral groove and carried up and discharged into the bottom of the hanger pipe where it will remain indefinitely. If any considerable quantity collects, it will merely raise the level of the oil in the hanger pipe.

If desired, the oil pipe 27 may be omitted, and in place of the spiral channel the usual oil ducts may be provided in the bushing for conveying oil along the shaft to the bottom of the bushing. A column of oil of sufficient height may be maintained in the hanger pipe to overcome the water pressure, whereby the pressure of oil in the clearance space will be sufficient to prevent any oil from entering the clearance space.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In a shaft bearing for pumps, the combination of a pump case, a shaft extending thereinto, an impeller on the end of the shaft contained in said pump case, a bearing member for the shaft located in said pump case, a metal seal ring loosely surrounding said shaft below said bearing member and spring pressed against the lower end thereof, a compressible seal ring spring pressed against said metal seal ring, said seal rings rotating with the shaft, and said compressible seal ring being frictionally held on the shaft, and means for supplying lubricating oil to said bearing at a pressure in excess of the pressure external of the bearing.

2. In a shaft bearing for pumps, the combination of a hanger pipe, a pump case secured thereto, a rotary shaft extending into the pump case, an impeller on the end of the shaft located in said pump case, a bearing bushing for said shaft located in said pump case, said bearing bushing being formed with a spiral groove on its internal face leading to a place adjacent its lower end, an oil pipe leading from said groove and extending up into the hanger pipe, and there being a discharge conduit communicating with the lower end of the groove and extending up into the hanger pipe, the rotating shaft acting to force oil through said spiral groove against water pressure external of the bearing bushing.

3. In a shaft bearing for pumps, the combination of a hanger pipe, a pump case secured thereto, a rotary shaft extending into the pump case, an impeller on the end of the shaft located in said pump case, a bearing bushing for said shaft located in said pump case, said bearing bushing being formed with a spiral groove on its internal face leading to a place adjacent its lower end, an oil pipe leading from said groove and extending up into the hanger pipe, and there being a discharge conduit communicating with the lower end of the groove and extending up into the hanger pipe, the rotating shaft acting to force oil through said spiral groove against water pressure external of the bearing bushing, and sealing members surrounding said shaft below said bearing bushing and spring pressed against the lower end thereof, said sealing members rotating with the shaft.

4. In a shaft bearing, the combination of a hanger pipe, a pump case secured thereto, a rotating shaft extending into the pump case, on impeller on the end of the shaft located in the pump case, a bearing bushing for said shaft located in the pump case, the clearance space between the shaft and bearing bushing communicating with the interior of the hanger pipe, a seal around the shaft below the bearing bushing, and a body of lubricating oil contained in said hanger pipe and in said clearance space.

5. In a shaft bearing, the combination of a hanger pipe, a pump case secured thereto, a rotating shaft extending into the pump case, an impeller on the end of the shaft located in the pump case, a bearing bushing for said shaft located in the pump case and having an internal spiral groove on its internal face in communication with the interior of the hanger pipe, a seal around the shaft below the bearing, and a column of lubricating oil contained in the hanger pipe and flowing through said spiral groove against pressure of water external of the bearing bushing.

6. In a shaft bearing for pumps, the combination of a pump case having a bearing therein, a rotary shaft journaled in said bearing, an impeller mounted on said shaft, a metal seal ring loosely surrounding said shaft below the bearing and spring pressed against the lower end of said bearing, a compressible seal ring spring pressed against said metal seal ring, said compressible seal ring being frictionally held on the shaft and both rings rotating therewith, an oil reservoir above said pump case, and means for supplying lubricating oil therefrom to said bearing above the seal rings at a pressure in excess of the pressure external of the bearing.

7. In a shaft bearing for pumps, the combination of a hanger pipe, a pump case secured thereto and having a shaft bearing therein formed with a spiral groove on its internal face leading to a place adjacent its lower end, a rotary shaft extending into the pump case and journaled in said bearing, an impeller on the end of the shaft and located in said pump case, an oil pipe leading from the spiral groove in the bearing and extending up into the hanger pipe, and there being a discharge conduit leading from the lower end of the spiral groove and extending to the hanger pipe, the rotating shaft acting to force oil through said spiral groove against pressure external of the bearing.

8. In a shaft bearing for pumps, the combination of a hanger pipe, a pump case secured thereto, a rotary shaft extending into the pump case, an impeller on the end of the shaft and located in the pump case, a bearing bushing for said shaft located in said pump case, there being a spiral groove between said shaft and bearing bushing and having an entrance opening leading from said hanger pipe, and a discharge opening leading to said hanger pipe, whereby oil contained in said hanger pipe is circulated through said bearing and back to the hanger pipe.

AUGUSTUS C. DURDIN, Jr.